April 6, 1954
J. A. FAVRE
2,674,345
INSTANTANEOUS LATCH RELEASED ENERGY
STORING LOAD OPERATING DEVICE
Filed Oct. 25, 1951
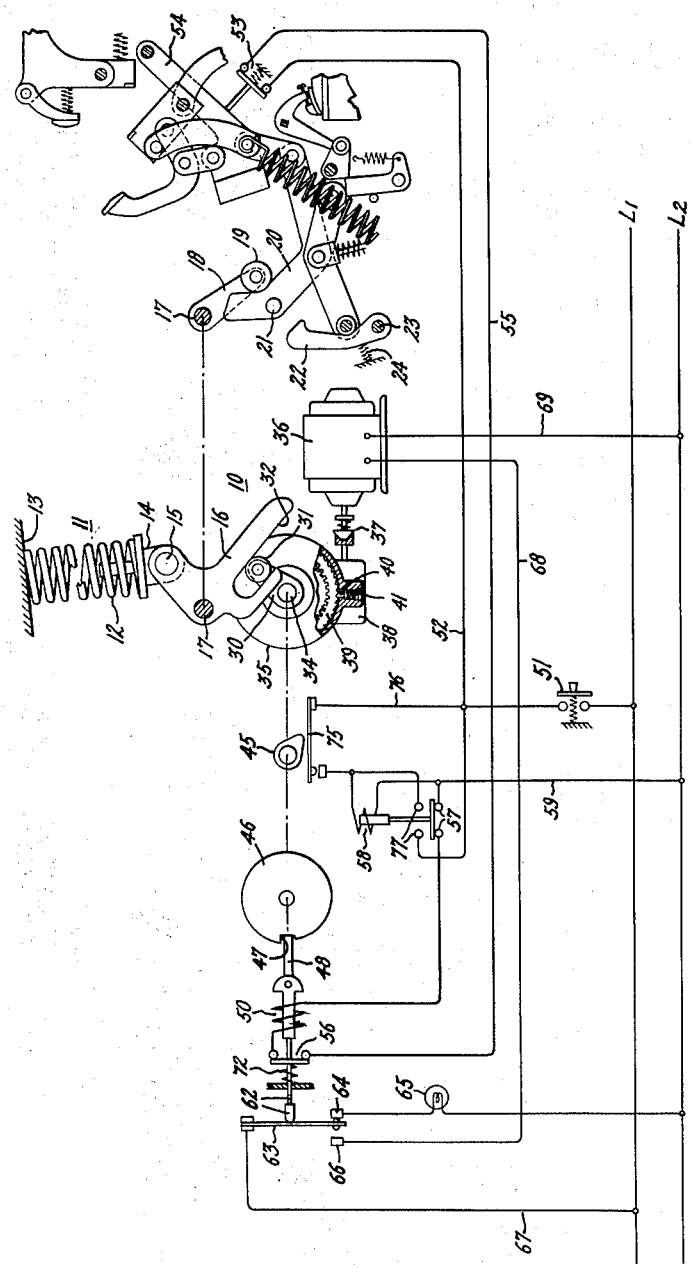
Inventor:
John A. Favre
by Ernest C. Britton
His Attorney.

Patented Apr. 6, 1954

2,674,345

UNITED STATES PATENT OFFICE 2,674,345

INSTANTANEOUS LATCH RELEASED ENERGY STORING LOAD OPERATING DEVICE

John A. Favre, Broomall, Pa., assignor to General Electric Company, a corporation of New York Application October 25, 1951, Serial No. 253,163

8 Claims. (Cl. 185—37)

My present invention provides improvements for obtaining substantially instantaneous latch release of energy storing load operating devices, particularly of the improved electric motor driven overrunning type disclosed and claimed in my prior application, Serial No. 196,075, filed November 16, 1950, now Patent No. 2,667,076, and assigned to the assignee of the present invention. Such improved electric motor driven overrunning type of energy storing load operating device is particularly suitable for quickly closing heavy-duty circuit breakers that are biased to the open position.

In the preferred form, the energy accumulator is in the form of powerful springs that are provided with charging and release mechanism including differentially interconnected unequal toothed gears to obtain a very large force amplifying ratio when one of the differential gears is held against rotation in one direction by a one-way clutch and a relatively small torque is applied through a high ratio irreversible worm gear to drive the intermeshing planet gear around its orbit by a relatively small electric driving motor so as to rotate an orbital cam member connected with the other differential gear through a partial revolution to move a cam follower in the form of a pivoted load operating lever against the bias of the powerful energy accumulating springs and thereby obtain a powerful source of stored energy that will automatically be released as soon as the orbital cam member is moved over center to freely overrun the one toothed gear during the remainder of each revolution of the orbital element. In this way a very large operating force can be produced by a relatively small electric driving motor and readily triggered for closing the circuit breaker or for other similar service.

As disclosed in my prior application the energy accumulating springs can be charged by energizing the motor for an interval sufficient to rotate the orbital cam member to an angular position a little short of dead center and thereby held charged by the cam member and irreversible driving gear mechanism with the motor de-energized so that the motor and orbital cam member can then automatically act as an electrically releasable trigger to release the energy stored in the springs by overrunning the one-way clutch connection upon re-energization of the motor to move the cam member over center. However, due to the tremendously large gear ratio through which the small driving motor necessarily operates, an appreciable time interval may be required to effect the movement of the cam member over center and such an appreciable time interval, even though relatively small, may become undesirable, as for example when the circuit breaker must be closed substantially instantaneously for accurately synchronizing alternating current generators.

Hence, an object of the present invention is to provide improved control means for producing a predetermined partial revolution of the orbital cam member sufficient not only to charge the accumulator but also to carry the orbital cam member to a slightly over center position so that the energy stored in the accumulator will automatically effect the remainder of each revolution of the cam member and also provide separately releasable latching means effective for holding the orbital cam member in the predetermined over center position against continued revolution by the energy stored in the accumulator so as to release the large stored operating force of the accumulator substantially instantaneously upon separate release of the latching means.

Another object is to provide a mechanical latch mechanism for holding an electric motor driven overrunning energy accumulator mechanism charged with an electrically operable control mechanism for releasing the latch to discharge the energy accumulator and with switching means operated by the mechanism for energizing the driving motor to recharge the energy accumulator after each discharge thereof and for maintaining the latch released and the motor energized until the charging of the accumulator is completed.

Other objects are to provide improved safety switching control and also anti-pumping relay switching control for the electrically releasable latch and the driving motor of the energy accumulator so as to insure only one release of the latch and subsequent recharging of the energy accumulator each time a latch tripping circuit is closed by a master control switch.

Further objects and advantages of the present invention will appear from the following description of the accompanying drawing, in which the single figure is a schematic view showing the electric motor-driven energy storing operating device applied for closing a multiple toggle operated heavy duty circuit breaker and provided with the improved instantaneously releasable latch and sequential motor energizing control improvements of the present invention.

As shown in the drawing, the electric motor driven, energy storing, operating device indicated generally by the reference character 10 is of the improved type disclosed in my prior application and is provided with an energy accumulator 11 in the form of a heavy coil compression spring 12, with its upper end fixed against a suitable abutment 13 and its lower end engaging a spring seat 14 that is pivotally connected by means of pin 15 to operate a reciprocating or oscillating load operating member in the form of the bell crank 16 upon the release of the energy stored in the spring 12. Upon reverse operation of the bell crank 16, the energy accumulator is charged by compressing the spring 12. As indicated in the drawing, the load operating bell crank 16 is fixed to shaft 17 that carries an arm 18 having a roller 19 mounted at the end thereof for engaging with a closing lever 20 of a circuit breaker which is biased open and may be of the improved type described and claimed in my application, Serial No. 137,411, filed January 7, 1950, now Patent No. 2,581,181, assigned to the assignee of the present invention. In this way, the circuit breaker reclosing arm 20 is moved to the position wherein the pin 21 carried by the arm 20 is engaged by the holding latch 22, that is pivoted on the pin 23 and biased by a suitable spring 24, into latching relation in the path of pin 21. Thus, it may be desired that the energy stored in the compression spring 12 should be suddenly released to rotate the load operating member or bell crank 16 and thereby rotate shaft 17 to engage roller 19 with the lever arm 20 in order to quickly close the circuit breaker in generator synchronizing or other similar service.

In order to charge the accumulator 11 by compressing spring 12, a rotatable crank arm 30 carries a cam roller 31 at its free end in an orbital path to constitute an orbital element for engagement with the flat cam follower surface 32 of the bell crank 16 and thereby form a reciprocating to rotary motion transforming connection so as to fully compress spring 12 when the orbital cam 31 is rotated through a partial revolution. Then as soon as cam 31 moves over center the energy stored in the accumulator 11 becomes effective to complete the revolution of the orbital cam 31. As shown in the drawing, the orbital cam 31 has been rotated counterclockwise through the partial revolution required to charge the accumulator 11 and further rotated to a slightly over center position, so that the energy stored in the accumulator 11 is thus effective to force the orbital cam face 32 against the cam 31 and thereby continue the revolution thereof until the orbital element 31 reaches the angular position limiting the further discharge of the accumulator 11.

The cam operating arm 30 is fixedly mounted upon the end the shaft 34, which is driven by means of suitable differential force amplifying and overrunning clutch mechanism that is enclosed within the casing 35 and the detailed structure of which is more fully described and illustrated in my prior application, Serial No. 196,075, now Patent No. 2,667,076. The electric driving motor 36 is shown connected by means of a load limiting slip clutch 37 to take care of overrunning of the latch 48. A suitable high ratio irreversible worm is mounted in the projecting casing 38, to provide a relatively high force amplifying ratio sufficient to rotate the crank arm 30 through the partial revolution required to charge the accumulator 11 when one of the differential gears 39 is held against rotation by the one-way clutch member 40 that is biased by the spring 41 into locking engagement with the ratchet teeth formed on the periphery of the differential gear 39 as shown in the broken-away section.

In accordance with the present invention, the orbital cam driving shaft 34 is extended so as to carry the switch operating cam 45 and the locking disk 46 that is provided with a peripheral notch 47 for engagement by the slidably mounted latch 48 in order to hold the accumulator 11 charged with the orbital cam 31 in the slightly over center position in which it is shown in the drawing.

Thus in order substantially instantaneously to release the energy stored in the accumulator 11 for quickly closing the circuit breaker, all that is necessary is to release the latch 48. For this purpose, the releasing electro-magnet 50 is connected to be energized from the supply lines L1—L2 by means of a master control switch 51 that may be manually operated as shown or automatically operated, if desired. The energizing circuit for the latch releasing electro-magnet 50 extends from the supply line L1 through the master control switch 51, conductor 52, the interlock switch 53 that is normally biased open and is closed only when the circuit breaker arm 54 is in the open position, the conductor 55, switch 56, the operating winding of the latch-releasing electromagnet 50, and the normally closed contacts 57 of an anti-pumping relay 58, and thence through the conductor 59 to the other supply line L2. Upon the resulting release of latch 48, the energy stored in the accumulator 11 becomes immediately effective to rotate the orbital cam arm 30 through a partial revolution since the one-way clutch 40 overruns to free the orbital cam 31 for continued revolution by the energy stored in the accumulator. Thus, the accumulator is immediately effective to move the load operating bell crank 16 and carry roller 19 into engagement with the arm 20 so as to quickly close the circuit breaker.

When the latch 48 is released, the pin 62, which is adjustable in length as shown, is operated by the releasing electromagnet 50 to move the switch arm 63 out of engagement with contact 64 and thereby de-energize the signal lamp 65 that is lighted whenever the accumulator 11 is charged and properly latched in the charged position. At the same time the switch arm 63 is carried into engagement with the contact 66, so as to complete an energizing circuit for the driving motor 36 extending from the supply line L1 through conductor 67, switch arm 63, contact 66, conductor 68, motor 36, and conductor 69 to the supply line L2. In this way, the driving motor 36 is energized so as to begin the recharging of the accumulator 11 as soon as the latch 48 is released although the motor energization control switch 63 may be arranged to be operated by other parts of the mechanism if desired.

Ordinarily, the master control switch 51 will be released as soon as the latch 48 is released and the cam disk 46 serves as a connection with the orbital element 31 that will maintain the latch 48 released and the motor energizing circuit completed through switch 63 and contact 66 until the accumulator 11 is fully charged, and the orbital cam arm 30 is returned to the slightly over center position in which the latch 48 re-engages with the notch 47 in the disk 46, due to the bias of the spring 72. Upon or just prior to such reengagement of the latch 48 depending upon the adjustment of pin 62, the energizing circuit of motor 36 is opened and, in case the motor should continue rotation due to momentum, the load limiting slip clutch 37 will slip and thereby prevent any excess strains being produced in the high ratio force amplifying gear mechanism.

In order to prevent pumping in case the master control switch 51 should remain closed, and in the further event that the circuit breaker has returned to the open position so as to close the interlock switch 53, the anti-pumping relay 58 is arranged to open its normally closed contacts 57. This is accomplished by means of the cam 45 closing the switch 75 during the final stage of the charging of the accumulator 11. Thus, in case the master switch 51 is maintained closed, an additional control circuit will now extend through the master switch 51, conductor 76, switch arm 75, and the operating winding of the anti-pumping relay 58, and conductor 59 to the supply line L2. As a result, relay 58 opens its normally closed contacts 57 thus breaking the above mentioned latch tripping circuit at this point and closes the auxiliary contacts 77, thereby completing a holding circuit for the operating winding of the anti-pump relay 58 that extends through the master control switch 51 independently of the cam-operated switch 75. As a result, the master switch 51 necessarily must be opened in order to de-energize the anti-pump relay 58 in order to reclose the normally closed contact switch 57, and thereby permit a subsequent closure of the master control switch 51 to again effect energization of the latch-releasing electromagnet 50. In this way, the anti-pump relay 58 prevents more than one release of the latch 48 upon each closure of the master control switch 51.

What I claim as new and desire to secure by Letters Patent of the United States is:

1. In combination, an energy accumulator having a reciprocating member for charging and discharging the accumulator, an orbital element having reciprocating to rotary motion transforming connections with the member to drive the element from an overcenter position through a partial revolution upon discharge of the accumulator and to drive the member to charge the accumulator during the remainder of each revolution of the element, means including a latch for latching the orbital element in the overcenter position to hold the accumulator charged, an electric motor mechanism for driving the orbital element to charge the accumulator and provided with an overrunning drive connection for overrunning the motor during the discharge of the accumulator upon release of the latch, and control mechanism having an electromagnet provided with a connection for releasing the latch to discharge the accumulator and with switching means for energizing the motor to charge the accumulator upon a temporary energization of the electromagnet and means including a cam having connections with the orbital element for independently maintaining the latch released and the motor energized until the accumulator is charged.

2. In combination, an energy storing compression spring having one end fixed and having a reciprocating member engaging the other end for compressing and expanding the spring, an orbital element having reciprocating to rotary motion transforming connections with the member to drive the element from an overcenter position through a partial revolution upon expansion of the spring and to drive the member to compress the spring during the remainder of each revolution of the element, means including a latch for latching the orbital element in the overcenter position to hold the spring compressed, an electric motor mechanism for driving the orbital element to compress the spring and provided with an overrunning drive connection for overrunning the motor during the expansion of the spring upon release of the latch, control mechanism having an electromagnet provided with an operating connection for releasing the latch to expand the spring and switching means for energizing the motor to compress the spring upon a temporary energization of the electromagnet and means including a cam having connections with the orbital element for independently maintaining the latch released and the motor energized until the spring is compressed.

3. In combination, an energy accumulator having mechanism for operating a load, an electric driving motor having power amplifying means for charging the accumulator provided with a one-way clutch for overrunning when the accumulator operates the load, means including a latch for holding the accumulator charged to effect substantially instantaneous operation of the load upon release of the latch, and control means including an electromagnet provided with connections for releasing the latch to discharge the accumulator and with switching means for energizing the motor to recharge the accumulator upon a temporary energization of the electromagnet and having control mechanism rendered effective upon each release of the latch for maintaining the motor energized and the latch released until the accumulator is charged.

4. In combination a load member having means for automatically moving the member to one position, an energy accumulator having mechanism for operating the load member from the one position to another position, an electric driving motor having power amplifying means provided with a load limiting clutch for charging the accumulator and with a one-way clutch for overrunning when the charged accumulator operates the load member, means including a latch for holding the accumulator charged to effect substantially instantaneous operation of the load member upon release of the latch, and control means including an electromagnet provided with connections for releasing the latch to discharge the accumulator and with switching means for energizing the motor to recharge the accumulator upon temporary energization of the electromagnet and having control mechanism rendered effective upon each release of the latch for maintaining the motor energized and the latch released until the accumulator is charged.

5. In combination, a load member having means for automatically moving the member to one position, an energy accumulator having mechanism for operating the load member from the one position to another position, an electric driving motor having power amplifying means for charging the accumulator provided with a one-way clutch for overrunning when the accumulator operates the load member, means including a latch for holding the accumulator charged to effect substantially instantaneous operation of the load member upon release of the latch, switching means having connections with the latch for energizing the motor to recharge the accumulator upon each release of the latch and de-energizing the motor upon return of the latch to the holding position, and electrical means for releasing the latch having a control switch for rendering the latch releasing means effective only when the load member is in the one position.

6. In combination, a load member having condition responsive means for automatically moving the member to one position, an energy accumulator having mechanism for operating load member from the one position to another position, an electric driving motor having mechanism for charging the accumulator including a one-way clutch for overrunning when the accumulator operates the load member, means including a latch for holding the accumulator charged to effect substantially instantaneous operation of the load member upon release of the latch, switching means having connections with the latch for energizing the motor to recharge the accumulator upon each release of the latch and de-energizing the motor upon return of the latch to the holding position, and electrical means for releasing the latch having control switching means for rendering the latch releasing means effective only when the load member is in the one position and the latch is in the holding position.

7. In combination, an energy accumulator having mechanism for operating a load, an electric driving motor having mechanism for charging the accumulator including a one-way clutch for overrunning when the accumulator operates the load, means including a latch for holding the accumulator charged to effect substantially instantaneous operation of the load upon release of the latch, switching means having connections with the latch for energizing the motor to recharge the accumulator upon each release of the latch and de-energizing the motor upon return of the latch to the holding position, and electrical means for releasing the latch having a master control switch provided with interconnected anti-pumping relay switching means for preventing more than one release of the latch upon each operation of the master control switch.

8. In combination a load member having condition responsive means for automatically moving the member to one position, an energy accumulator having mechanism for operating the load member from the one position to another position, an electric driving motor having mechanism for charging the accumulator including a one-way clutch for overrunning when the accumulator operates the load member, means including a latch for holding the accumulator charged to effect substantially instantaneous operation of the member upon release of the latch, switching means having connections with the latch for energizing the motor to recharge the accumulator upon each release of the latch and de-energizing the motor upon return of the latch to the holding position, and electrical means for releasing the latch having a master control switch provided with interconnected control switching means for rendering the latch releasing means effective only when the load member is in the one position and the latch is in the holding position and with interconnected anti-pumping relay switching means for preventing more than one release of the latch upon each operation of the master control switch.

References Cited in the file of this patent

UNITED STATES PATENTS

| Number | Name | Date |
| --- | --- | --- |
| 829,841 | Button | Aug. 28, 1906 |
| 2,410,253 | Trogner | Oct. 29, 1946 |